United States Patent [19]

Nishimura et al.

[11] Patent Number: 4,524,267
[45] Date of Patent: Jun. 18, 1985

[54] CASH ACCOUNTING SYSTEM HAVING DATA COMPILING CAPABILITY

[75] Inventors: Katsuji Nishimura, Habikino; Hachizou Yamamoto, Nara, both of Japan

[73] Assignee: Sharp Kabushiki Kaisha, Osaka, Japan

[21] Appl. No.: 450,474

[22] Filed: Dec. 16, 1982

[30] Foreign Application Priority Data

Dec. 24, 1981 [JP] Japan ................................ 56-212228

[51] Int. Cl.³ ............................................. G06F 15/30
[52] U.S. Cl. .................................................. 235/379
[58] Field of Search ......................... 235/379; 364/406

[56] References Cited

U.S. PATENT DOCUMENTS 4,001,568  1/1977  Iizuka ................................... 364/406
4,443,692  4/1984  Nishimura ........................... 235/379

Primary Examiner—Harold I. Pitts
Attorney, Agent, or Firm—Birch, Stewart, Kolasch & Birch

[57] ABSTRACT

A cash accounting system registers and stores information relating to money transacted according to the denomination thereof, and has a data compiling capability. This system is operable during a checking operation to compile the amount of money registered according to denomination thereof, and to provide information related to numbers of units, and fractions thereof, of money in each denomination. The units of the respective denominations comprise predetermined amounts of money in each denomination.

2 Claims, 4 Drawing Figures

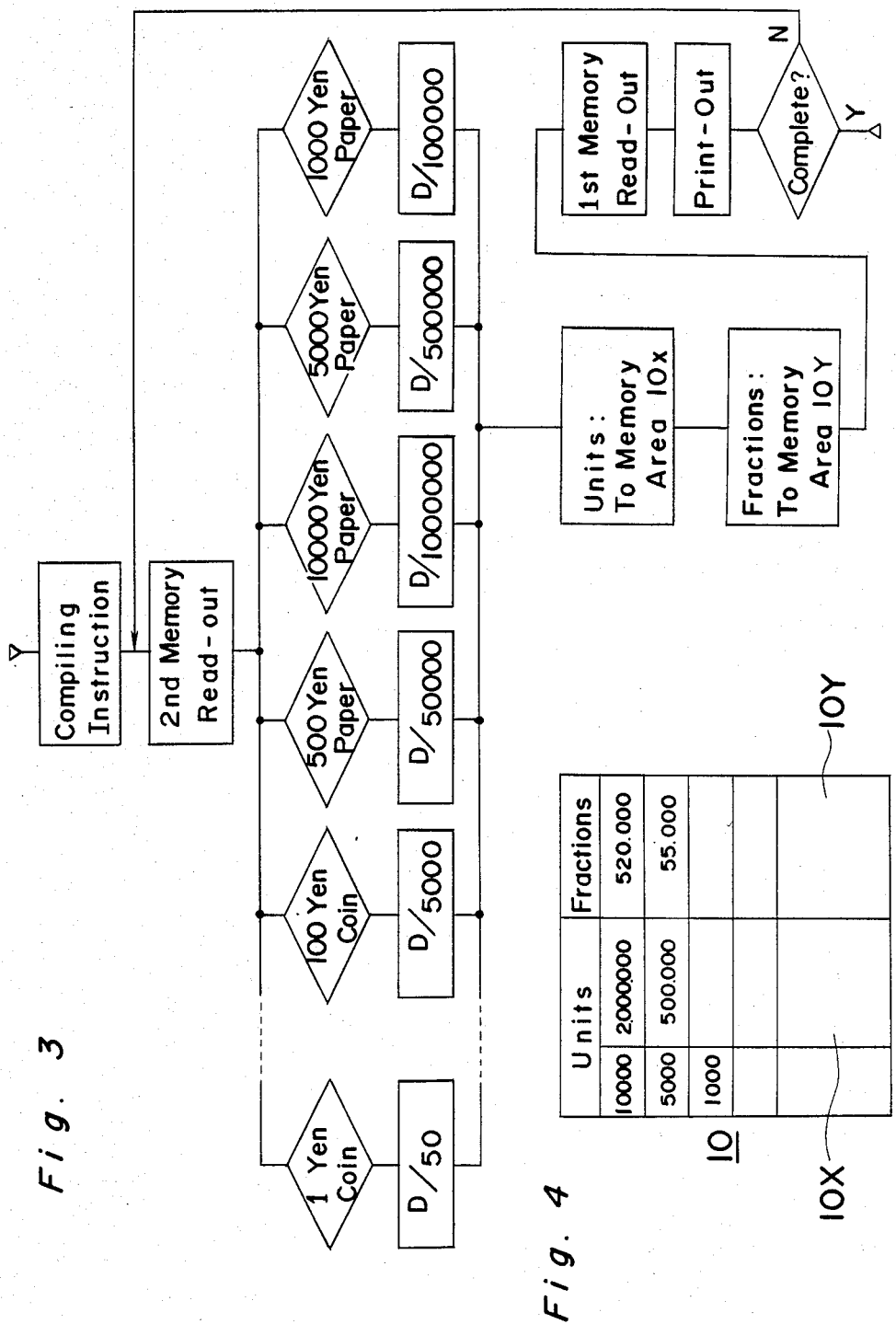

CASH ACCOUNTING SYSTEM HAVING DATA COMPILING CAPABILITY

BACKGROUND OF THE INVENTION

The present invention relates to an improvement in a cash accounting system used in, for example, a bank for the management of money transactions and, more particularly, to a cash accounting system having a data compiling capability for facilitating the check of various registrations.

In general, a cash accounting system is of a construction shown in FIG. 1 of the accompanying drawings. When a certain money transaction takes place, an operator has to manipulate a mode selector 1 to render the system in a registration mode. When this mode selector 1 has been manipulated, the mode information is stored in a mode information memory 2, which mode information is, when the operator depresses any of the numerical keys in a digit entry means 3, using tens keys for the registration of the transaction, or one of the function keys in a function keyboard 4, and after an input detector 5 has detected a key signal indicative of the depression of such key, fed to and stored in a predetermined area a in a central processing unit (CPU) 6.

The central processing unit 6 serves to discriminate the mode information and then to process data, which are successively fed thereto, according to a program stored in a read-only memory (ROM) 7. An essential portion of this program is shown in FIG. 2.

In the manner described above, when the system is set in the registration mode, the operator depresses a specific item key, included in the function key board 4, to cause an item signal to be entered in the CPU 6 through a key discriminator 8 in order to instruct the type of items to which the data to be registered belongs.

Subsequently, the operator again manipulate the digit entry means 3 to enter the sum of money in the CPU 6 through a key encoder 9, and also, in order to instruct to the CPU 6 whether the transaction is a deposit or a payment, the operator depresses also either a deposit key included in the function keyboard 4 or a pay key also included in the function keyboard 4.

Thereafter, by manipulating one of the denomination keys, that is, the key t, of the function keyboard 4, the operator has to enter information concerning the denomination of money being transacted. By way of example, where the money being transacted includes 252 ten-thousand papers, he or she should depress the key indicative of unit the ten-thousand unit and then tens keys indicative of the decimal digits reading "2,520,000".

The sum of the money transacted and the sub-totals of the money classified according to the denomination both entered in the system in the manner as hereinabove described are fed to and stored through an input/output control 11 in the predetermined areas of a first memory 10 designated by an address counter 12. In the first memory, the amount of money deposited, the amount of money paid and the sub-totals of the money according to the denomination are respectively stored at predetermined areas 10a, 10b, 10c and 10d. So far illustrated, the denomination consists of respective units of ten-thousands, five-thousands, one-thousands, five-hundreds, one-hundred, fifty, ten, five and one.

When the input manipulation so effected is completed, the operator, in an attempt to verify whether or not the sum of the money transacted, which has been entered in the system, is equal to the total of the sub-totals of the money according to the denomination, has to depress a verifying key P included in the function keyboard 4 to instruct the CPU 6 through the key discriminator 8 to perform a zero-proofing.

Upon receipt of this instruction, the CPU 6 transfers the contents stored in the first memory 10, that is, the sum of the money transacted and the sub-totals of the money according to the denomination, through an input/output control 14 to predetermined areas of a second memory 13 designated by an address counter 12' and, erases the contents from the first memory 10, in the event that the sum of the money transacted is found to be equal to the total of the sub-totals of the money according to the denomination.

On the other hand, in the event that the two are not found to be equal, a display unit 15 displays information and calls the operator's attention to the fact that an error has occurred in the registration.

It is to be noted that the above described series of registrations are successively printed out from a printer 16.

Each time a new transaction takes place, the operator repeats the above described sequence of manipulations. Where the registration of all of the transactions which took place during, for example a certain day has been completed and the operator wishes to check it, the operator has to render the system in a check mode by manipulating the keys in a manner similar to that described hereinabove.

When a check key R in the function keyboard 4 is subsequently depressed, the CPU 6 upon receipt of an signal from the check key R, instructs the printer 16 to read out and record on a sheet the contents stored in the second memory 13.

The information printed on the recording sheet is the contents which have been stored in the second memory 13, that is, the sum of the money transacted and the sub-totals of the money according to the denomination as shown in Table 1 below.

TABLE 1

| Denomination | Stock |
| --- | --- |
| Ten-thousand Yen Paper | 2,520,000 |
| Five-thousand Yen Paper | 555,000 |
| Thousand Yen Paper | |
| . | |
| . | |
| . | |
| Five Yen Coin | |
| One Yen Coin | |

Apart from the above, a checking method generally employed by bankers for checking the stock of cash is such that, in case of money papers, they are sorted in units of 100 papers whereas, in case of coins, they are sorted in units of 50 coins, and the stock is then recorded with fractions thereof.

Therefore, with the prior art cash accounting system, even though the sum of money transacted and the sub-totals of money according to the denomination are stored, the system is unable to store each amount of money sorted and the fractions thereof and, accordingly, each amount of money sorted and the fractions thereof cannot be printed on the recording sheet.

In view of the above, the banker is forced to perform the checking in such a way to sort each amount of money with reference to the recording sheet printed out from the printer.

SUMMARY OF THE INVENTION

Accordingly, the present invention has been developed with a view to substantially eliminating the disadvantages and inconveniences inherent in the prior art cash accounting system and has for its essential object to provide an improved cash accounting system which is effective to sort the money of each denomination into a number of units and fractions thereof only by manipulating a specific key during the checking of the system and also to store the contents thereof temporarily in a memory and to print out them on a check list.

BRIEF DESCRIPTION OF THE DRAWINGS

This and other objects and features of the present invention will become clear from the following description taken in conjunction with a preferred embodiment thereof with reference to the accompanying drawings, in which:

FIG. 3 is a flow chart showing the sequence of operation of the system according to the present invention; and;

FIG. 4 is a diagram showing one example of the contents stored in a memory used in the system of the present invention.

DETAILED DESCRIPTION OF THE EMBODIMENT

Figure 1:
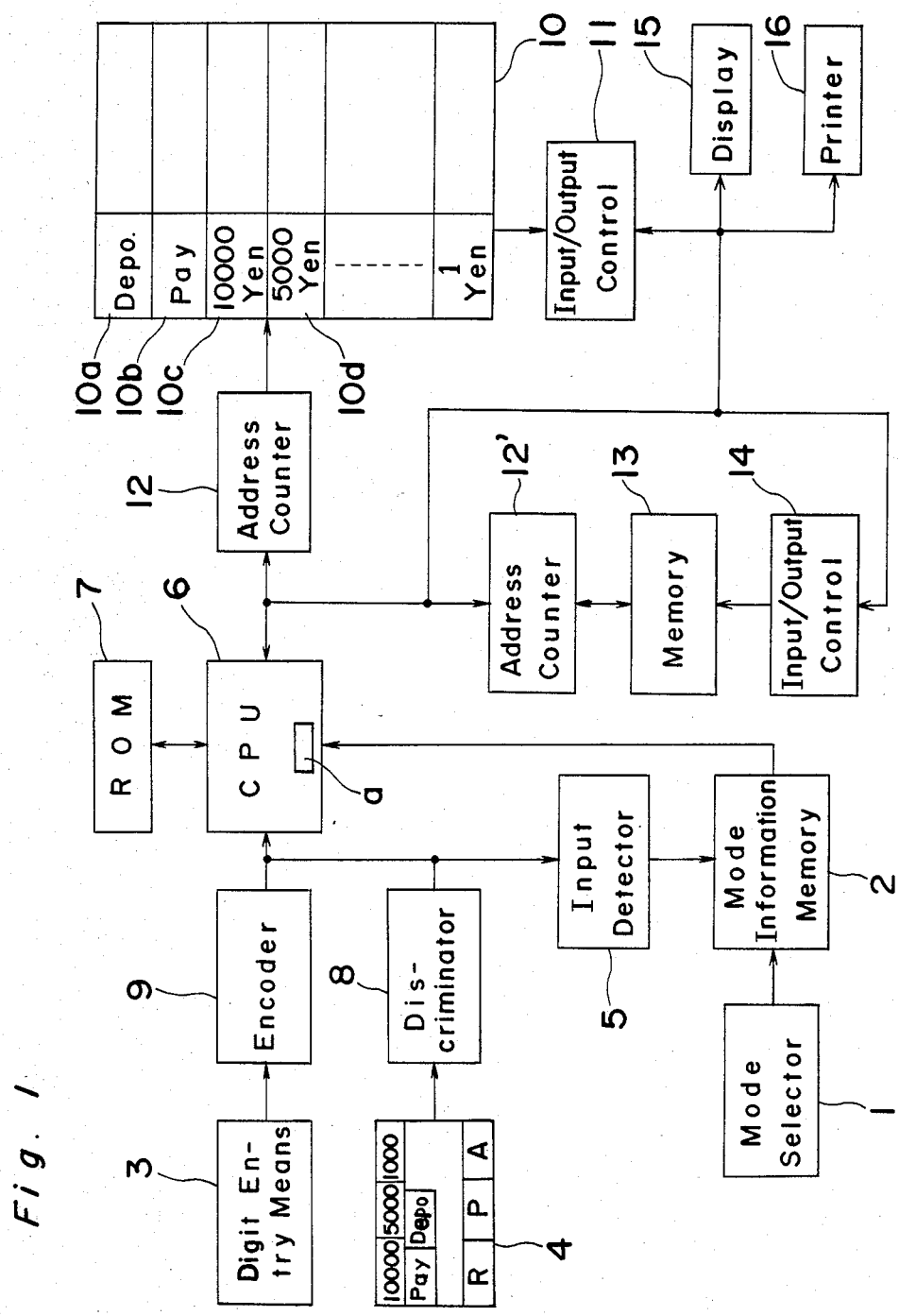
FIG. 1 is a circuit block diagram showing a cash accounting system to which the present invention is applied.

Before the description of the present invention proceeds, it is to be noted that like parts are designated by like reference numerals throughout the accompanying drawings.

Figure 2:
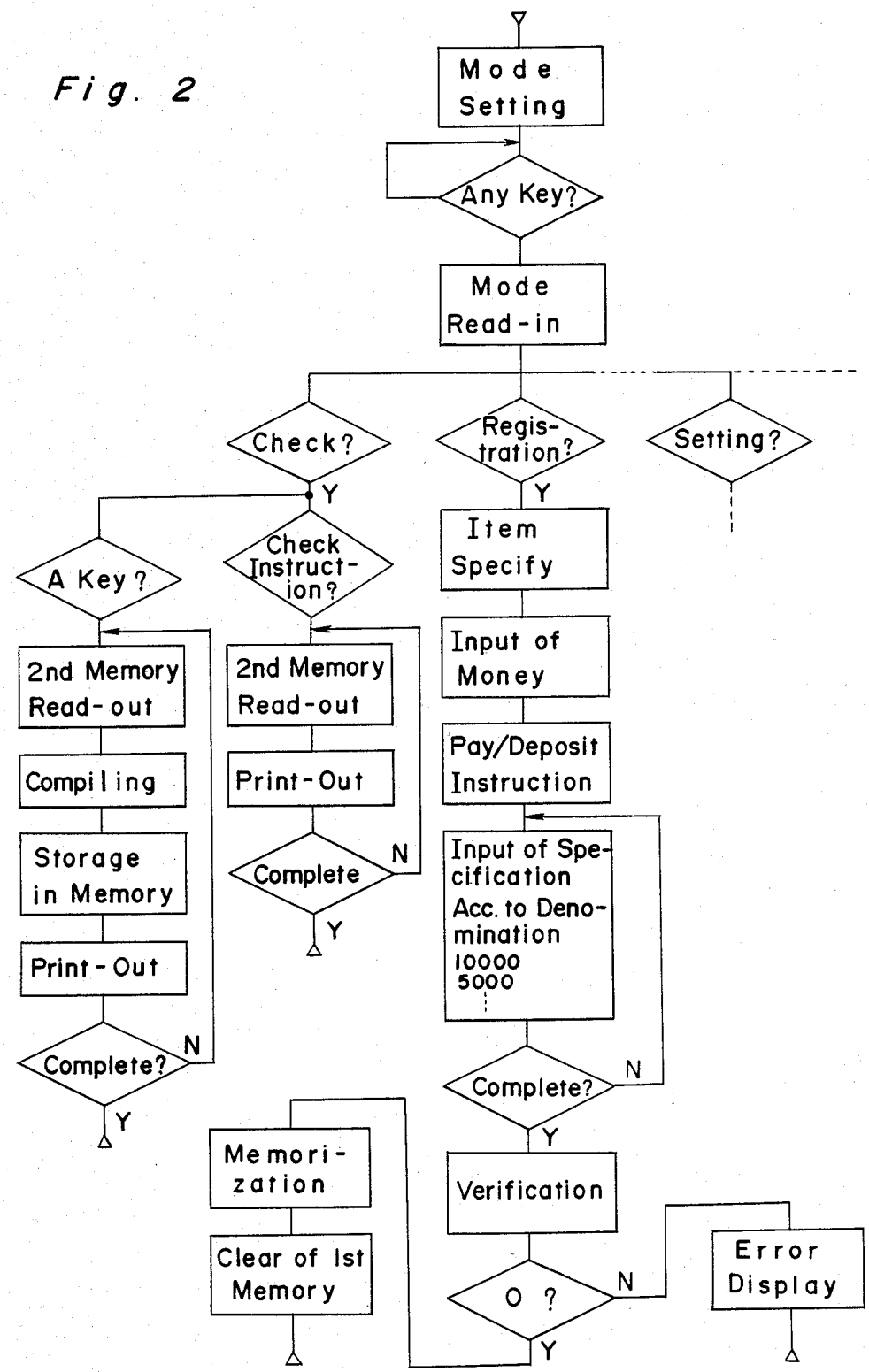
FIG. 2 is a flow chart showing the sequence of operation of the system shown in FIG. 1.

The present invention will now be described with reference to the flow charts shown respectively in FIGS. 2 and 3. It is, however, to be noted that, since in the present invention a part of the cash accounting procedure to register the transactions is identical with that described hereinbefore, the details thereof will not be reiterated herein for the sake of brevity.

The CPU 6 performs, upon receipt of a check mode command, such a function as to divide the amount of transacted money and the sub-totals of the money according to the denomination, both being stored in the memory 13 to give the amount of money per unit, or an integer multiple thereof, and its fractions. By way of example, the CPU 6 performs the division by one million yen as a divisor in the case of the ten-thousand yen paper, by five hundred thousand yen as a divisor in the case of the five thousand yen paper, by one hundred thousand yen as a divisor in the case of the thousand yen paper, by fifty thousand yen as a divisor in the case of the five hundred yen paper, by five thousand yen as a divisor in the case of the one hundred yen coin, by two thousand and five hundred yen as a divisor in the case of the fifty yen coin, by five hundred yen as a divisor in the case of ten yen coin, by two hundred and fifty yen as a divisor in the case of the five yen coin, and by fifty yen as a divisor in the case of the one yen coin.

Assuming that the current stock amounts to 3,075,000 yen, consisting of 252 ten thousand yen papers and 111 five thousand yen papers, this current stock is written in the second memory 12 according to the amount for each denomination.

Where such a check list as shown in Table 2 is desired, the operator renders the system in the check mode in a manner as hereinbefore described, and then depresses a compiling key A included in the function keyboard 4.

When this compiling key A is actuated on, the CPU 6 reads out the current stock stored in the second memory and performs such a calculation as to classify the currency in units. In the case of the ten thousand yen paper, it is classified into units of one million yen and fractions below the one million yen, thereby giving the calculation result of 2000000+520000. 2,000,000 yen and 52,0000 yen are respectively stored in areas 10X and 10Y in the first memory 10. In addition, with respect to the five thousand yen paper, the calculation is made so as to classify into the units of five hundred thousand yen and the fractions below the five hundred thousand yen, thereby giving the result of 500,000+55,000, and 500,000 yen and 55,000 yen are respectively stored at the areas 10X and 10Y in the first memory 10.

Based on such data as stored in the first memory 10, the check list such as shown in Table 2 is printed out from the printer 16.

TABLE 2

|  | Unit | Fractions |
|---|---|---|
| Ten-thousand Yen Paper | 2,000,000 | 520,000 |
| Five-thousand Yen Paper | 500,000 | 55,000 |

Similarly, the calculation is made to classify units of 100,000 and the fractions below 100,000 in the case of the thousand yen paper, units of 5,000 and the fractions below 5,000 in the case of the hundred yen coin, units of 2,500 in the case of the fifty yen coin and the fractions below 2,500, units of 500 and fractions below 500 in the case of the ten yen coin, units of 250 and the fractions below 250 in the case of the five yen coin, and units of 50 and the fractions below 50 in the case of the one yen coin, and a check list similar to that shown in Table 2 can be printed out.

It is to be noted that FIG. 3 is a flow chart showing the sequence of operation described above. It is to be noted that, in FIG. 3, D represents the data read out from the second memory 13.

As hereinbefore described in detail, since the present invention is such that the current stock of money is classified according to its predetermined units and its fractions thereof and is then printed out automatically, any manual intervention hitherto required to do this work with reference to the check list can advantageously be eliminated and, also, the operator's burden can be reduced permitting him or her to perform an accurate and ready checking.

Although the present invention has been described in connection with the preferred embodiment thereof with reference to the accompanying drawings, it is to be noted that various changes and modifications are apparent to those skilled in the art. Such changes and modifications are to be understood as included within the true scope of the present invention.

We claim:

1. In a cash accounting system for registering and storing information regarding money transactions, means for facilitating auditing and checking said system and transactions comprising, means for inputting data regarding money transacted in each transaction;

first memory means for separately storing first information related to amounts of money in each of a plurality of denominations transacted in each transaction;

second memory means for separately storing second information related to accumulated amounts of money in each of a plurality of denominations; and checking means associated with said second memory means, said checking means comprising means for segregating said second information related to each denomination into unit information representing numbers of units of currency items in such denomination, each unit having a predetermined monetary value, and fractional unit information representing a fractional portion of such unit.

2. A cash accounting system as in claim 1, further comprising output means for providing said unit information and said fractional unit information for each of said plurality of denominations to an operator for facilitating said auditing and checking.

* * * * *